United States Patent Office
3,510,681
Patented May 5, 1970

3,510,681

CURRENT STEERING NETWORKS PROVIDING THE EXCLUSIVE OR FUNCTION

Michael Cooperman, Cherry Hill, N.J., assignor to RCA Corporation, a corporation of Delaware Filed Dec. 23, 1966, Ser. No. 604,343
Int. Cl. H03k 19/20, 19/32
U.S. Cl. 307—216 5 Claims

ABSTRACT OF THE DISCLOSURE

An EXCLUSIVE OR gate comprises a pair of current steering networks with each including first and second emitter-coupled transistors. A threshold element, such as a diode, is coupled to each emitter of the first transistors in the current steering networks to provide an unbalance in the threshold of conduction between the first and second transistors in each of the current steering networks. Constant currents of substantially equal magnitudes are applied respectively to the pair of current steering networks. A first binary input signal is applied to both the input electrode of the first transistor in the first current steering network and the input electrode of the second transistor in the second current steering network, whereas a second binary input signal is applied to both the input electrode of the second transistor in the first current steering network and the input electrode of the first transistor in the second current steering network. A binary output signal is derived only when the binary input signals are of opposite value to provide the EXCLUSIVE OR function.

This invention relates to current steering circuits, and more particularly relates to current steering circuits utilized as logic gates.

One form of logic gate is an EXCLUSIVE OR gate. In such a gate, an output is produced when any one, and only one, of two binary input signals is in its prescribed state, i.e. the "true" state. Heretofore, the attainment of the EXCLUSIVE OR logic function normally required a plurality of inter-connected AND and OR gates.

It is an object of this invention to provide a simplified EXCLUSIVE OR gate utilizing relatively few components.

It is another object of this invention to provide a new and improved current steering circuit.

A current steering circuit embodying the invention includes first and second transistors, with each having input, common, and output electrodes and with each transistor exhibiting a threshold of conduction. An additional threshold element is coupled to the common electrode of the first transistor to create a threshold unbalance with respect to the second of the transistors. When the common-to-output electrode current paths of the transistors are both coupled to a substantially constant courrent source and first and second binary input signals are applied respectively to the first and second transistors, the first transistor conducts only when the first binary input signal is, for example more positive, than the second binary input signal.

To provide a logic gate exhibiting an EXCLUSIVE OR function, a pair of the current steering circuits are arranged so that the first binary input signal is applied to the first and second transistors of the first and second steering circuits respectively, whereas the second binary input signal is applied to the second and first transistors of the first and second steering circuits respectively. This cross coupling effectively causes the first transistor in each of the steering circuits to conduct alternately when one and only one binary "1" input signal is present. This operation provides the EXCLUSIVE OR logic function.

In the drawings:

FIG. 1 is a schematic circuit diagram of a logic gate embodying the invention,

FIG. 2 is a table illustrating certain operating characteristics of the circuit of FIG. 1, and FIG. 3 is another embodiment of a logic gate embodying the invention.

Referring now to FIG. 1, a logic gate 10 includes first 12 and second 14 current steering circuits. The first current steering circuit 12 includes first and second transistors 16 and 18 respectively. The first and second transistors 16 and 18 in the first current steering circuit 12 are illustrated as NPN type transistors although it is of course apparent that PNP type transistors could be utilized in practicing the invention. The same is true for the transistors in the second current steering circuit 14. The first and second transistors 16 and 18 include input electrodes 20 and 22, common emitter electrodes 24 and 26, and output collector electrodes 28 and 30, respectively. The emitter electrode 24 of the first transistor 16 is coupled to a threshold element 32 that is illustrated in FIG. 1 as a diode. The electrode 24 is coupled to the anode of the diode 32 whereas the cathode of the diode 32 is coupled through a resistor 34 to the terminal 36 of a source of negative potential $-V_1$. The emitter 26 of the second transistor 18 is also coupled through the resistor 34 to the negative potential terminal 36. The interconnecting point of the diode 32, resistor 34, and emitter electrode 26 defines a junction point 33. The combination of the negative potential source $-V_1$ and the resistor 34 provides a substantially constant current source 37. The first and second transistors 16 and 18 are emitter coupled to this source 37. The collector 30 of the second transistor 18 is connected to a point of reference potential in the circuit, such as ground, whereas the collector electrode 28 of the first transistor 16 is coupled through an output resistor 38 to circuit ground. The ungrounded side of the resistor 38 provides an output terminal 39. Thus the emitter-to-collector current conducting paths of the transistors 16 and 18 are coupled in parallel to the substantially constant current source 37. By applying appropriate input signals, the current from the source 37 steers through one or the other of these transistors. The thereshold element 32 produces a threshold unbalance in the current steering circuit 12, that requires the application of a higher input signal to the transistor 16 in order to cause conduction that is necessary in the case of the transistor 18.

The second current steering circuit 14 also includes first and second transistors 40 and 42, with each having input base electrodes 44 and 46, common emitter electrodes 48 and 50, and output collector electrodes 52 and 54 respectively. The emitter electrode 48 of the transistor 40 in the second transistor steering circuit 14 is coupled through a threshold diode 56 and a resistor 58 to a negative potential terminal 60 of a negative power supply $-V_2$. The resistor 58 and source $-V_2$ define a substantially constant current source 59. The emitter 50 of the second transistor 42 is coupled to the terminal 60 through the resistor 58. The interconnecting point of the diode 56, resistor 58, and emitter 50 defines a junction point 57. The collector 54 of the transistor 42 is grounded whereas the collector 52 of the transistor is connected to the output terminal 39. Thus the common-to-ouput electrode conducting paths are connected in parallel to the current source 59.

A first binary input signal A is applied to an input terminal 62 whereas a second binary input signal B is applied to an input terminal 64. The input terminal 62 is coupled to the input base electrode 20 of the first transistor 16 in the first current steering circuit 12 and to the input base electrode 46 of the second transistor 42 in the second current steering circuit 14. The second input terminal 64 is coupled to the input base electrode 22 of the second transistor 18 in the first current steering circuit 12 and to the input base electrode 44 of the first transistor 40 in the second current steering circuit 14. Thus the binary input signals A and B are effectively cross coupled by being applied to alternate transistors in the first and second steering circuits 12 and 14.

The logic gate 10 may be fabricated in integrated form on a single chip and, in such case, the diodes 32 and 56 may be transistors with, for example, the collector of each coupled to the base of each to provide diode operation. Alternatively the threshold elements 32 and 56 may be transistors exhibiting the normal threshold of a base-to-emitter junction. For silicon transistors the normal base-to-emitter voltage drop is about 0.8 volt and for silicon diodes the voltage drop is also about 0.8 volt. The operation of the gate 10 is described assuming the use of such components. The inclusion of the threshold elements effectively doubles the threshold of conduction of each of the first transistors 16 and 40.

In FIG. 2, there is illustrated a tabular form of typical operating characteristics of the logic gate 10. Substantially equal constant currents $I_{e_1}$ and $I_{e_2}$ are derived from the constant current sources 37 and 59 in each of the current steering circuits 12 and 14 respectively. The current $I_{e_1}$, for example, is diverted through the emitter-to-collector current conducting path of either of the transistors 16 or 18 depending upon the relative values of the binary input signals A and B. It is assumed that binary input signals of absolute voltages of 0 volt and −1.6 volts are applied as input signals to the logic gate 10. A signal level of 0 volt may for example represent a binary "0" whereas a signal level of −1.6 volts represents a binary "1".

As shown in the table in FIG. 2, when two binary input signals of 0 volt, or binary "0" are applied to the terminals A and B respectively, the currents $I_{e_1}$ and $I_{e_2}$ of the constant current sources 37 and 59 are steered through the current conducting paths of the second transistors 18 and 42 in each of the current steering circuits 12 and 14. This is because the threshold of conduction of each of the second transistors 18 and 42 are exceeded and the conduction of each of these transistors clamps the junction points 33 and 57 to levels that prevent the threshold of conduction of the transistors 16 and 40 in combination with the threshold element 32 and 56 from being exceeded. Consequently, the substantially constant and equal currents $I_{e_1}$ and $I_{e_2}$ flow through the second transistors 18 and 42 of each steering circuit to ground. A similar situation arises when input signals of −1.6 volts or binary "1's" are applied to the input terminals 62 and 64. However, when the binary input A is −1.6 volts, i.e. a "1," and the binary input signal B is 0 volt, i.e. a "0," the first transistor 40 in the second steering circuit 14 conducts and clamps the junction point 57 to substantially −1.6 volts. This prevents the transistor 42 from conducting since the input signal thereto is also −1.6 volts. The current $I_{e_2}$ is therefore steered through the first transistor 40 in the circuit 14 and causes a voltage drop in the output resistor 38 producing a binary "1" output. Similarly, when the binary input signal A is 0 volt and the binary input signal B is −1.6 volts, the current $I_{e_1}$ is steered through the transistor 16 causing a binary "1" output from the terminal 39 of the gate 10. Thus output signals are produced from the gate 10 when one and only one of the binary input signals is a binary 1. This is an EXCLUSIVE OR logic function.

The values of the components shown in FIG. 1 may be as follows:

−V1 equals −V2 equals −5 volts
resistor 34 equals resistor 58 equals 600 ohms
resistor 38 equals 270 ohms Referring now to FIG. 3, there is shown a second embodiment of the logic gate 10. In view of the fact that the schematic diagrams of FIGS. 1 and 3 are substantially identical the various components in the gate 10' of FIG. 3 are given the same reference numerals as corresponding components of the gate 10 of FIG. 1, except for the fact that these reference numerals are primed in FIG. 3. The gate 10' differs from the gate 10 in that the output resistor 38' of the gate 10' is coupled to a source of positive potential $V_3$ that may for example equal +1.6 volts. Such a connection prevents the transistors 16' and 40' from being driven into saturation when conducting. To insure that the output signal from the output terminal 39' of the gate 10' is on a compatible level with the binary input signals A' and B', a transistor 70 is coupled between the output resistor 38' and the output terminal 39' of the gate 10'. The transistor 70 includes a base electrode 72 coupled to one junction of the resistor 38' and a collector electrode 74 coupled to a positive potential terminal 76 of the power supply $V_3$. The transistor 70 also includes an emitter electrode 78 that is coupled through a level shifting diode 80 and an output resistor 82 to power supply $-V_4$, of −5 volts. Thus one terminal of the resistor 82 is coupled to the power supply and the other terminal of the resistor 82 comprises the output terminal 39' of the gate 10'. The advantage of the gate 10' is that the transistors 16' and 40' do not saturate when driven into conduction and consequently the speed of the gate 10' is increased over that of the gate 10 in FIG. 1. The operation of the two circuits are otherwise similar.

Thus a current steering circuit embodying the invention is coupled into a logic gate array that provides an EXCLUSIVE OR logic function with relatively few components. The gates may be operated rapidly in a non-saturation mode by current steering. Only one level of gates is required for the logic function and there need not be complementary binary inputs to the gate.

What is claimed is:

1. A circuit comprising in combination,
first and second current steering networks with each including first and second transistors of the same type conductivity with each of said transistors including an input electrode, a common electrode, and an output electrode,
first and second threshold elements each coupled respectively to the common electrode of the first transistor in each of said first and second current steering networks,
means for applying substantially constant currents of substantially equal magnitude to the common-output electrode current paths of said first and second transistors in each of said first and second current steering networks, and
means for applying a first input signal to the input base electrodes of said first transistor in said first current steering network and said second transistor in said second current steering network,
means for applying a second input signal to the input base electrodes of said second transistor in said first current steering network and said first transistor in said second current steering network, and
means for deriving from said circuit an output signal having a value dependent on the relative values of said first and second input signals.

2. A circuit in accordance with claim 1 wherein said first and second input signals comprise signals of binary values.

3. A circuit in accordance with claim 1 wherein said threshold elements comprise diodes.

4. A circuit in accordance with claim 1 wherein said input electrode comprises a base electrode, said common electrode comprises an emitter electrode and said output electrode comprises a collector electrode.

5. A circuit in accordance with claim 4 wherein each of said substantially constant currents is emitter coupled to said first and second transistors in each of said first and second current steering networks.

References Cited

UNITED STATES PATENTS

| | | | |
|---|---|---|---|
| 3,003,071 | 10/1961 | Henle | 307—216 |
| 3,118,073 | 1/1964 | Walsh | 307—216 X |

FOREIGN PATENTS

| | | | |
|---|---|---|---|
| 1,232,185 | 10/1960 | France. | |

OTHER REFERENCES

Jen, I.B.M. Technical Disclosure Bulletin, vol. 8, No. 8, 1-66, (pp. 1156-1157).

DONALD D. FORRER, Primary Examiner

S. D. MILLER, Assistant Examiner

U.S. Cl. X.R.

328—93, 159